(12) United States Patent
Ryan, Jr.

(10) Patent No.: US 7,991,704 B2
(45) Date of Patent: Aug. 2, 2011

(54) METHOD OF POST SELECTION OF AND PAYMENT FOR DOMESTIC AND INTERNATIONAL MAIL VALUE ADDED SERVICES

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1775 days.

(21) Appl. No.: 11/156,156

(22) Filed: Jun. 17, 2005

(65) Prior Publication Data

US 2007/0005376 A1      Jan. 4, 2007

(51) Int. Cl.
*G06Q 30/00* (2006.01)
(52) U.S. Cl. ...................................................... 705/333
(58) Field of Classification Search .................. 705/401, 705/333
See application file for complete search history.

(56) References Cited

U.S. PATENT DOCUMENTS

| | | | |
|---|---|---|---|
| 5,925,864 A * | 7/1999 | Sansone et al. | ............... 235/375 |
| 6,954,742 B2 | 10/2005 | Cordery et al. | |
| 2004/0083189 A1 | 4/2004 | Leon | |
| 2004/0093312 A1* | 5/2004 | Cordery et al. | ............... 705/401 |
| 2004/0254808 A1* | 12/2004 | Bennett et al. | .................... 705/1 |
| 2005/0004881 A1 | 1/2005 | Klug | |

OTHER PUBLICATIONS

Jerry Hempstead, "USPS: A Valued Partner" Traffic World. Dec. 6, 2004.*
U.S. Postal Service Publication 197: Confirm Services User Guide, Sep. 2004.

* cited by examiner

*Primary Examiner* — John W Hayes
*Assistant Examiner* — Allen J Jung
(74) *Attorney, Agent, or Firm* — Brian A. Lemm; Charles R. Malandra, Jr.

(57) ABSTRACT

Methods and systems of providing tracking or other services for a mailpiece in a mail system having a service provider that is in communication with one or more posts. The mailpiece includes one or more unique identifiers associated therewith, and the service provider uses the unique identifiers to identify the mailpiece and cause or facilitate the rendering of the requested service. The service may be requested after the mailpiece has been mailed, and payment for the services need not be made until after they are performed. Also, a method of providing stored mailpiece information to an interested party based on request criteria that are provided by the interested party.

10 Claims, 5 Drawing Sheets

METHOD OF POST SELECTION OF AND PAYMENT FOR DOMESTIC AND INTERNATIONAL MAIL VALUE ADDED SERVICES

FIELD OF THE INVENTION

The present invention relates to mail services offered in connection with domestic and international mail, and in particular to a method of providing for the selection of and payment for domestic and international mail value added services after a mailpiece has been placed into the mail stream.

BACKGROUND OF THE INVENTION

Many posts around the world, such as the United States Postal Service (USPS), have sought to offer value added services to their customers, such as, without limitation, tracking of mailpieces, confirmation of delivery of mailpieces, and redirection of mailpieces mid-stream. Unfortunately, gaining access to and using such services is often difficult. In addition, implementation of such services can be inconsistent both within and among the various posts. It is also difficult for customers to obtain a refund for a service that was paid for but not performed. These problems are often magnified when a mailpiece is sent to an international destination. As a result, customers often do not avail themselves of such services. Thus, there is a need for a method of simplifying access to value added services and providing incentives to posts to improve their implementations of such service offerings.

SUMMARY OF THE INVENTION

The present invention relates to a method and system for providing value added services, such as, for example, tracking services, for a mailpiece that may be requested after the mailpiece has already entered the mail stream and need not be paid for until such value added services are requested and performed. A mail system has a service provider that is in communication with one or more posts. In addition, the mailpiece has one or more unique identifiers associated therewith. The method includes receiving the one or more unique identifiers at a service provider location from a requesting party and receiving tracking information associated with the mailpiece from each of one or more of the posts at the service provider location. The method further includes receiving a payment from the requesting party for the tracking information received, if any, from each of the one or more of the posts, and providing the received tracking information to the requesting party. In one embodiment, the method is a pull method, wherein, prior to the step of receiving tracking information, the method includes contacting the one or more posts, providing each of the one or more posts with at least one of the one or more unique identifiers, and requesting the tracking information associated with the mailpiece from each of the one or more posts. Alternatively, the method may be a push method, wherein information is periodically provided to the service provider by the posts.

The service provider may be independent from the one or more posts, or may be one of the one or more posts. In addition, one or more of the unique identifiers may be part of an indicium applied to the mailpiece, and/or may include a serial number and an ascending register value of a postage meter associated with the requesting party. Many other unique identifier implementations are also possible.

Another embodiment of the present invention relates to a method of providing a service for a mailpiece having one or more unique identifiers associated therewith. The method includes receiving a request for the service at a service provider location from a requesting party after the mailpiece has been mailed, wherein the request includes at least one of the one or more unique identifiers. The method also includes contacting one or more of the posts and determining, using at least one of the one or more unique identifiers, whether a particular one of the posts currently controls the mailpiece. Further, if it is determined that a particular one of the posts currently controls the mailpiece, the method includes: (i) instructing the particular post that currently controls the mailpiece to perform the service, and (ii) charging the requesting party for the service. The method may further include sending a payment to the particular one of the posts that currently controls the mailpiece for the service. The service may be a service selected from the group consisting of redirecting the mailpiece, obtaining a delivery confirmation for the mailpiece, and causing the mailpiece to be delivered on a particular date.

Yet another embodiment of the present invention relates to a method of providing mailpiece related information to an interested party, such as a mailer or an intended recipient. The method includes receiving an information request from the interested party that includes request criteria, determining whether information relating to each of one or more mailpieces that satisfy the request criteria is stored by at least one of the one or more posts, and, if it is determined that such information is stored: (i) receiving the information for each of the one or more mailpieces, (ii) charging the interested party for the information, and (iii) providing the information for each of the one or more mailpieces to the interested party. The method may be used in a system that includes a service provider in communication with one or more posts, wherein the receiving step includes the service provider receiving the information request, and wherein the determining step includes the service provider contacting one or more of the posts and requesting stored information relating to any received mailpiece that satisfies the request criteria. The request criteria may specify one or both of mailer identification information and destination identification information. The request criteria may also further specify a mailing date or range of dates. The method may also include sending a payment to each of the posts that stores information relating to each of one or more mailpieces that satisfy the request criteria. The information relating to the mailpieces that satisfy the request criteria may include tracking information and/or a unique mailpiece identifier.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
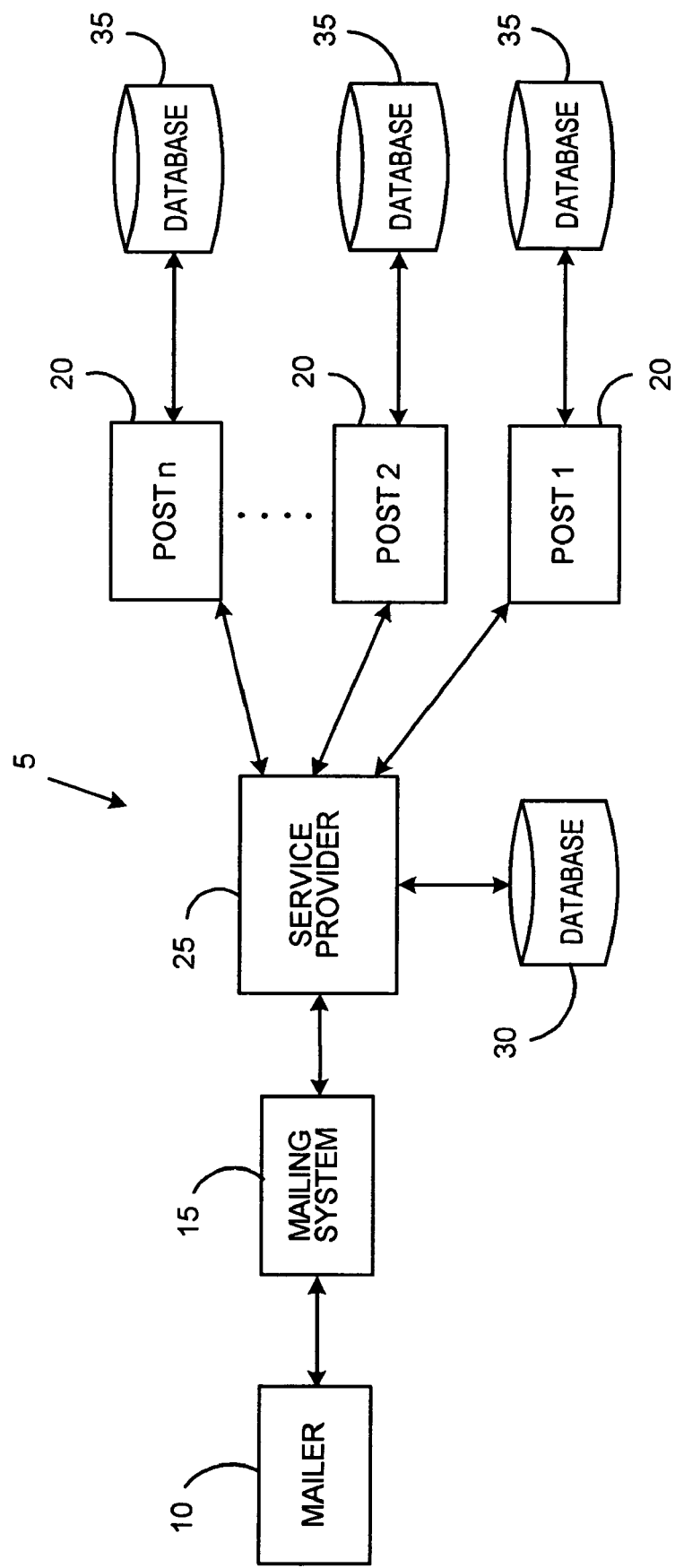
FIG. 1 is a block diagram of a system for providing for selection of and payment for domestic and international mail value added services after a mailpiece has been placed into the mail stream according to an embodiment of the present invention.

FIG. 1 is a block diagram of a system 5 for providing for the selection of and/or payment for domestic and international mail value added services after a mailpiece has been placed into the mail stream according to an embodiment of the present invention. System 5 includes a mailer 10 having a mailing system 15, such as, without limitation, a mailing machine that employs a conventional digital or analog postage meter, or a known PC-based open metering system that obtains postage from a remote data center and prints evidence of the postage at the mailer 10's site. The mailing system 15 is used by the mailer 10 to process mailpieces, including applying evidence of postage (an indicium) thereto, prior to the mailpieces being placed in the mail stream for handling and delivery by one or more of the posts 20 (posts 1 through n), which may be various government and/or private posts throughout the world.

A service provider 25 is in communication with the mailing system 15 and each of the posts 20 and facilitates the flow of information and funds between the mailer 10 and the posts 20 according to an embodiment of the invention as described herein. The service provider 25 may be a third party such as an entity that operates a data center and supplies postage to the mailing system 15, or an independent entity not otherwise associated with the mailing system 15 or any of the posts 20. The service provider 25 may also be one of the posts 20. The service provider 25 maintains a database 30 of information for use according to the present invention. Similarly, each of the posts 20 maintains a database 35 of information for use according to the present invention.

Figure 2:
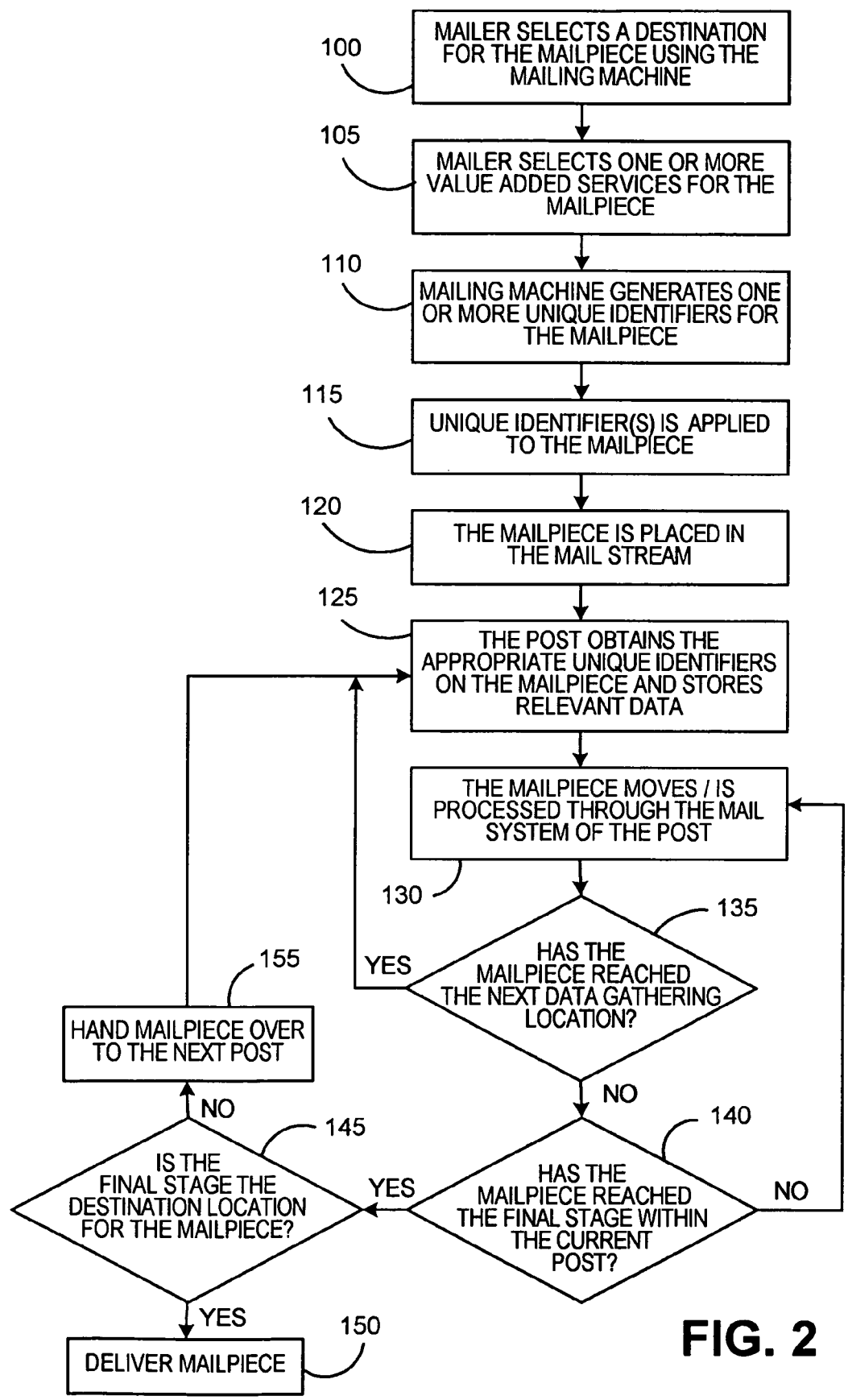
FIG. 2 is a flowchart showing a method of preparing a mailpiece and processing the mailpiece through to delivery according to an embodiment of the present invention.

FIG. 2 is a flowchart showing a method of preparing a mailpiece and processing the mailpiece through to delivery according to an embodiment of the present invention. At step 100, the mailer 10 prepares the mailpiece for mailing using mailing system 15 by, among other things, selecting the destination (including a country) for the mailpiece. Next, at step 105, the mailer 10 selects one or more value added services for the mailpiece, such as tracking of the mailpiece. It is likely that the most common value added service that will be requested is tracking of a mailpiece, and thus, for illustrative purposes, that service will be used in describing the invention in the embodiment of FIG. 2. However, it should be understood that other services, as described elsewhere herein, also fall with the scope of the present invention. Optionally, step 105 may be omitted, i.e., the mailer need not select a particular service up front.

At step 110, the mailing system 15 then generates one or more unique identifiers for the mailpiece, one for each of the posts 20 that are expected to handle the mailpiece during the delivery thereof. The unique identifier may be any alphanumeric combination that may be used to uniquely identify the mailpiece, and the standard for each unique identifier will be set by the particular post 20 in question. For example, the unique number may consist of a combination of the meter serial number and ascending register value of the postage meter forming a part of the mailing system 15 (as is known, that information is already contained in the postal indicia printed by many existing postage meters). As another alternative, the unique identifier could be a combination consisting of, for example, the Dun & Bradstreet number of the mailer (if applicable) or the USPS CONFIRM Subscriber ID assigned to the mailer followed by a serial number that changes for each mailpiece processed by the mailing system 15. In addition, one or more of the posts 20, such as the USPS and the UK post, may use the same unique identifier format.

At step 115, the one or more unique identifiers are applied to the mailpiece, either by printing them directly on the mailpiece or by printing them on a label that is affixed to the mailpiece (as noted above, for one or more of the posts 20, the unique identifier may in one embodiment be part of the indicium that is printed on the mailpiece). Next, at step 120, the mailpiece is placed in the mail stream, such as by depositing it in a mailbox. At step 125, the initial post 20 to receive the mailpiece obtains the unique identifier associated with it, such as by scanning or otherwise reading if from the mailpiece (for example, the unique identifier may be printed in the form of a bar code and read by a bar code reader or may be read by a device having optical character recognition (OCR) capabilities). In addition, that post 20 stores in its database 35 in connection with the appropriate unique identifier that was obtained from the mailpiece certain pertinent information relating to the mailpiece, such as the date on which and the location where the unique identifier was obtained. Then, at step 130, the mailpiece moves through the mail system of the post 20 and is processed thereby.

As is known, during processing by the USPS or another post, a typical mailpiece moves through two to four locations where its indicium is scanned and information is recorded. Thus, according to an aspect of the invention, at step 135, as the mailpiece moves through the mail system, a determination is made as to whether the mailpiece has reached the next data gathering point in the mail system where the post 20 will once again obtain and store the relevant information. If the answer is yes, then the method returns to step 125, where the appropriate unique identifier is obtained and the pertinent information is stored. If the answer is no, then, at step 140, a determination is made as to whether the mailpiece has reached the final stage within the current post 20. If the answer is no, then the method returns to step 130. If the answer is yes at step 140, then, at step 145, a determination is made as to whether the final stage is the destination location for the mailpiece within the mailing system of the current post 20, i.e., the location from which it will next be delivered to the recipient. If the answer is yes, then the mailpiece, at step 150, is delivered to the recipient. Depending upon the practices of the delivering post and/or any value added services the unique identifier may be obtained from the mailpiece and certain pertinent information retained when the mailpiece is delivered. If however, the answer at step 145 is no, then that means that another post 20 needs to now take over delivery of the mailpiece, and at step 155, the mailpiece is handed over to the next appropriate post 20, e.g., the post of a different (destination) country or a private post within the same country. Then, the method returns to step 125. Thus, as will be appreciated, the steps of FIG. 2 will result in the appropriate unique identifier being obtained and pertinent information being stored at various locations within the mail system of each post 20 that handles the mailpiece from the point of mailing to the point of delivery.

According to an aspect of the present invention, the mailer 10 can maintain a log of mailpieces processed by mailing system 15 and inserted into the mail stream wherein information identifying each mailpiece (such as recipient name or location and date of mailing) is stored along with the one or more unique identifiers assigned to the mailpiece. In this manner, the mailer 10 will be able to access the particular one or more unique identifiers for a mailpiece of interest for use as described below. This log may be maintained on the mailing system 15, on a separate computing device, or even manually.

Figure 3:
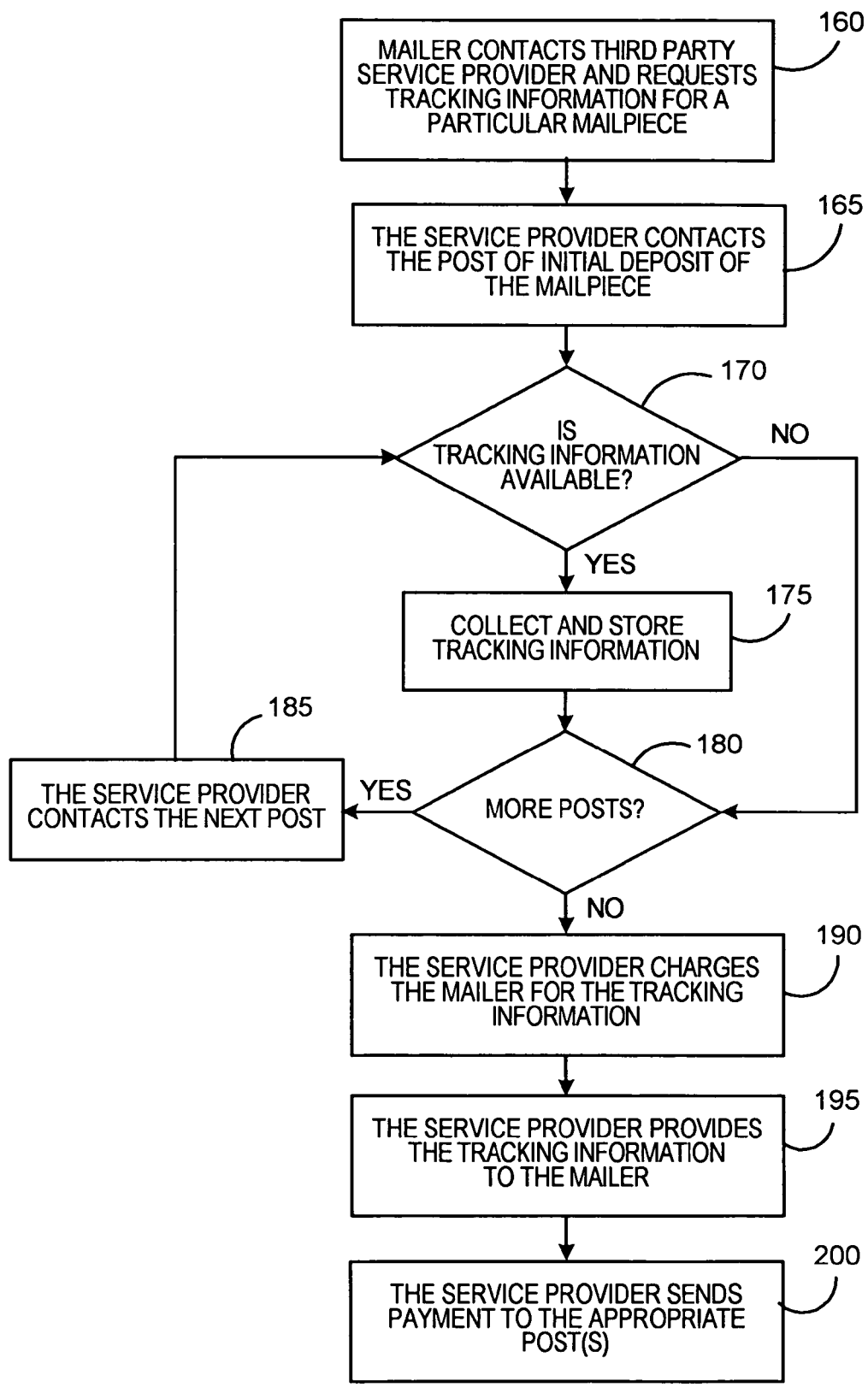
FIG. 3 is a flowchart showing a method of requesting and paying for tracking services/information for a mailpiece according to an embodiment of the present invention.

FIG. 3 is a flowchart showing a method of requesting and paying for tracking services/information for a mailpiece that has already been introduced into the mail stream according to an embodiment of the present invention. Thus, the mailer need not have requested nor paid for such services at the time the mailer introduced the mailpiece into the mail stream. At step 160, the mailer contacts the service provider 25 and requests tracking information for a particular mailpiece that has already entered the mail stream. This may be done in a number of ways, such as over the Internet through a secure web site, by email or by telephone. During this process, the mailer 10 provides to the service provider 25 each of the one or more unique identifiers assigned to the mailpiece and applied thereto. Next, at step 165, the service provider 25 contacts the post 20 with which the mailpiece was initially deposited. At step 170, a determination is made as to whether tracking information is available for that mailpiece. In particular, the post 20 checks its database 35 to determine whether any information is stored therein in connection with the unique identifier of the mailpiece in question. If the answer at step 170 is yes, then at step 175, the information is sent to the service provider 25 and is stored in the database 30. If the answer at step 170 is no, then the method proceeds directly to step 180.

At step 180, a determination is made as to whether there are any other posts 20 that have handled the mailpiece in question that therefore must be contacted. The service provider 25 can determine if more posts need to be contacted based upon the identifier provided by the mailer or the mailer's equipment, or based upon further information received from the current post (e.g., if the last database entry in the USPS database is handed over to Royal Mail, then Royal Mail is contacted to obtain information about the mailpiece.) If the answer at step 180 is yes, then at step 185, the service provider 25 contacts the next post 20. The method then returns to steps 170, 175 and 180, wherein information for that post 20, if available, is obtained and stored.

If the answer at step 180 is no, meaning all relevant posts 20 have been contacted, then at step 190, the service provider 25 charges the mailer 10 for the tracking information that was collected (if any was in fact collected). Payment may be made by the mailer 10 by any of a number of known methods, such as, for example, by providing credit card information to the service provider 25. At step 195, the service provider 25 provides the tracking information that was paid for to the mailer 10, for example in a manner similar to the manner in which the information was requested in step 160 (e.g., by telephone, using a secure web site, or by email). Then, at step 200, the service provider 25 sends payment to the appropriate post or posts 20 (i.e., those that provided tracking information). In the preferred embodiment, the service provider 25 deducts a fee for its service from the fees collected from the mailer 10 in step 190.

Thus, the steps shown in FIG. 3 enable a mailer 10 to request tracking information for a mailpiece after it was mailed, and the mailer 10 only needs to pay for tracking services if information is indeed available. This provides a distinct advantage over existing mail systems wherein tracking services must be selected and paid for up front at the time of mailing. In such systems, a refund must be requested after the fact if the service was not performed and/or if information is not available. In addition, tracking services are simplified because the service provider 25 is the party responsible for contacting each of the particular posts 20, a task that may be difficult and burdensome for the mailer 10.

As will be appreciated, the embodiment of the method shown in FIG. 3 may be considered an information "pull" method because the tracking information is stored by each individual post 20 (in the corresponding database 35) and is only sent to the service provider 25 upon request as needed. As an alternative, the present invention may be implemented as a "push" method wherein tracking information is periodically, e.g., once a day, transmitted to the service provider 25 where it is stored in database 30 in connection with the unique identifier of each mailpiece. Then, when information is requested by the mailer 10 (step 160), the service provider 25 accesses the appropriate information from the database 30, charges the mailer 10 for it, and sends payment to the appropriate post or posts 20.

Figure 4:
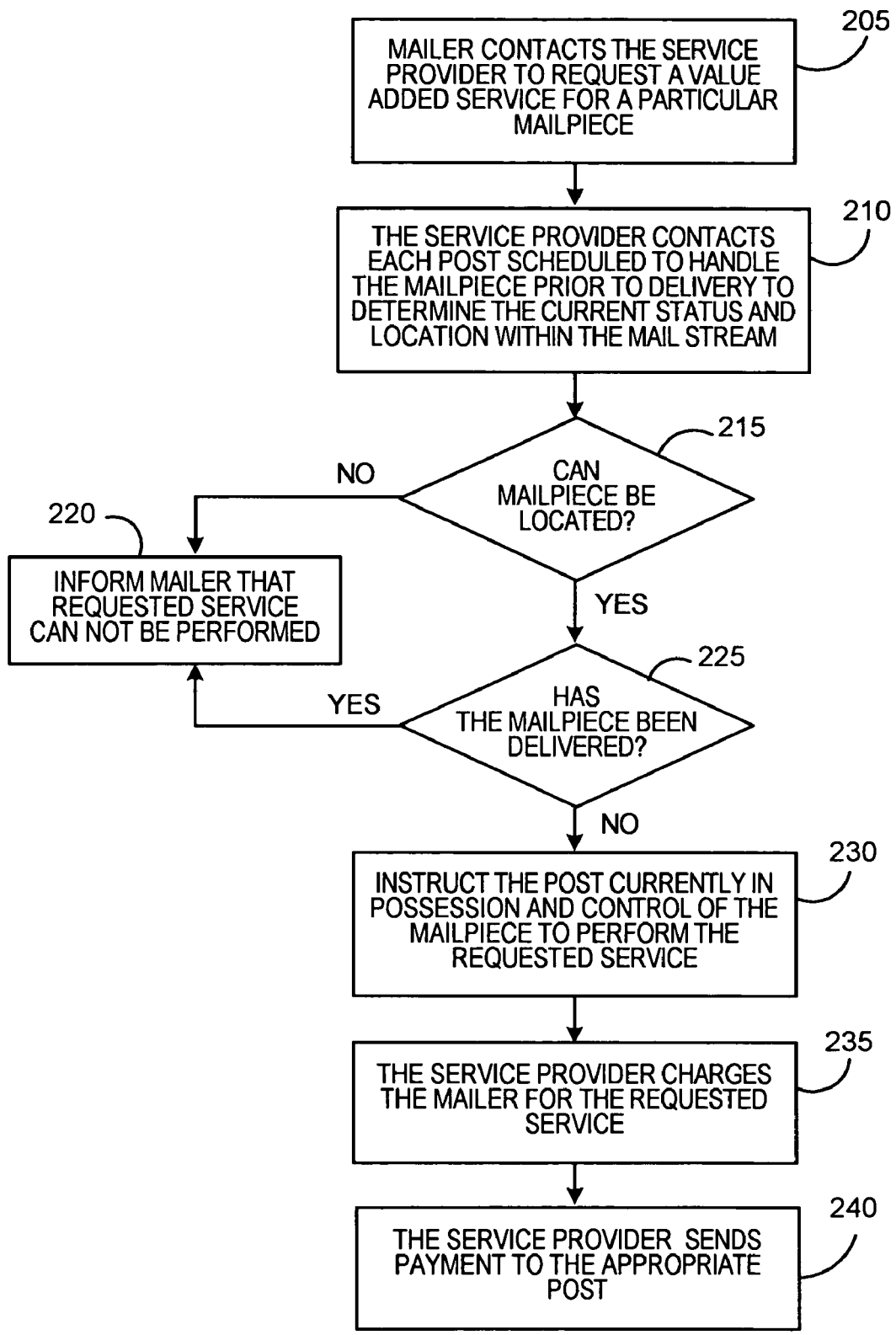
FIG. 4 is a flowchart showing a method of requesting and paying for value added services for a mailpiece according to another embodiment of the present invention.

FIG. 4 is a flowchart showing a method, according to another embodiment of the present invention, of requesting and paying for a number of different value added services for a mailpiece that has already been introduced into the mail stream in the manner described in connection with FIG. 2. Such value added services may include, without limitation, redirection of a mailpiece (e.g., send it to a different destination address or return it to the sender), delivery on a particular specified date, delivery confirmation (i.e., obtaining a signature from the recipient) and tracking. The method begins at step 205, where the mailer 10 contacts the service provider 25 to request a value added service for a particular mailpiece. This may be done in a number of ways, such as over the Internet through a secure web site, by email or by telephone. The mailer 10 identifies the mailpiece of interest using the one or more unique identifiers associated with the mailpiece. Next, at step 210, the service provider 25 contacts each post 20 that was scheduled to handle the mailpiece as it moves through the mail stream to determine the current status and location of the mailpiece (this is done using the unique identifier appropriate for each post 20 in question). A determination is then made, at step 215, as to whether the mailpiece can be located. If the answer at step 215 is no, then, at step 220, the mailer 10 is informed that the requested service cannot be performed. If, however, the answer at step 215 is yes, then, at step 225, a determination is made as to whether the mailpiece in question has already been successfully delivered to the intended recipient. If the answer is yes, then the method returns to step 220 where the mailer 10 is informed that the requested service cannot be performed.

If, however, the answer at step 225 is no, meaning that the mailpiece has been located and is still in the mail stream, then, at step 230, the service provider 25 instructs the post 20 that is currently in possession and control of the mailpiece to perform the requested service, such as, without limitation, redirecting the mailpiece, causing the mailpiece to be delivered on a particular date, or obtaining a delivery confirmation. Next, at step 235, the service provider 25 charges the mailer 10 for the requested service, such as, for example, by charging a credit card of the mailer 10. In step 240, the service provider 25 sends payment for the requested service to the appropriate post 20, preferably after deducting a fee for the service performed by service provider 25. Thus, the method shown in FIG. 4 enables a mailer to request and pay for value added services for a mailpiece after the mailpiece has been placed into the mail stream. The method is, from the standpoint of the mailer 10, simple and convenient as the mailer 10 need only contact the service provider 25 rather than each post 20 that may be involved in delivery of the mailpiece.

According to a further aspect of the invention, each mailpiece moving through system 5 is "scanned" one or more times by one or more of the posts 20 that handles the mailpiece. When scanned, each mailpiece is read and certain information relating to the mailpiece is obtained (such as through bar code reading or optical character recognition) and stored in the appropriate database 35 of the post 20. In particular, this information includes: (i) mailer identification information that identifies the particular mailer 10 that mailed the mailpiece and/or the particular mailing system 15 that processed the mailpiece, (ii) destination identification information that to some degree identifies the destination location of the mailpiece, and (iii) certain tracking information for the mailpiece including the date and place of the scan. The mailer identification information may be contained in and obtained from the indicium of the mailpiece or a unique identifier associated with the mailpiece (as described elsewhere herein), and may include, without limitation, the meter serial number associated with the postage meter forming part of the mailing system 15, a Dun & Bradstreet number, or the CONFIRM Subscriber ID or permit mail license number associated with the mailer 10. The destination identification information may include, without limitation, the recipient's name, address and/or zip (7 or 11 digit) or other postal code that appears on the mailpiece.

Figure 5:
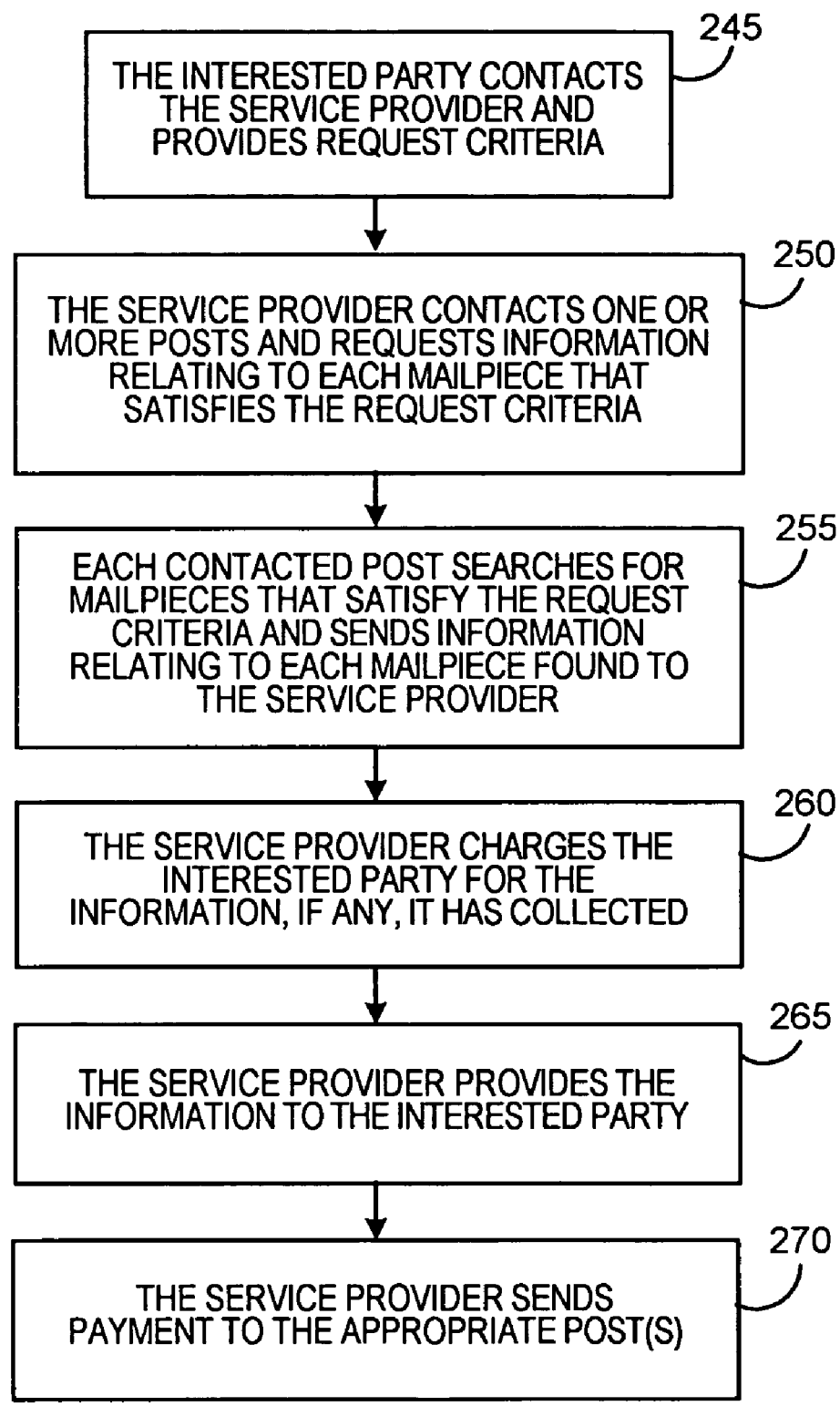
FIG. 5 is a flowchart showing a method that enables an interested party to request and be provided with information about one or more mailpieces either mailed by a particular mailer or intended for a particular recipient or location, or both, according to an embodiment of the invention.

FIG. 5 is a flowchart showing a method that enables an interested party, such as a mailer 10, an intended recipient or any other third party, to request and be provided with information about one or more mailpieces either mailed by a particular mailer 10, intended for a particular recipient or location, or both according to the above described aspect of the invention. At step 245, the interested party contacts the service provider 25 and provides certain request criteria to the service provider 25. The request criteria may specify certain mailer identification information and/or certain destination identification information, both as described above. The request criteria may also further include a particular mailing date or range of mailing dates. At step 250, the service provider 25 contacts one or more posts 20, provides the request criteria, and requests information relating to each mailpiece that satisfies the request criteria. The posts 20 that are contacted will preferably include one or more posts 20 that are likely to be handling or to have handled mailpieces satisfying the request criteria, and thus the choice of posts 20 will preferably be based on the request criteria. Next, at step 255, each contacted post 20 searches its database 35 for mailpieces that satisfy the request criteria and sends information relating to each mailpiece found to the service provider 25. The information returned may include stored tracking information, including a date of mailing and date and location of each scan, for the mailpiece and/or a unique identifier, as described elsewhere herein, associated with the mailpiece. It should be noted that even if the mailer does not place a unique identifier on the mailpiece, many posts will place a unique identifier on the mailpiece during processing (e.g., an ID tag). That unique ID could also be provided as part of the information and later used to request value added services.

At step 260, the service provider 25 charges the interested party for the information that was collected (if any was in fact collected). Payment may be made by any of a number of known methods, such as, for example, by providing credit card information to the service provider 25. At step 265, the service provider 25 provides the information that was paid for to the interested party, for example by telephone, using a secure web site, or by email. Then, at step 270, the service provider 25 sends payment to the appropriate post or posts 20 (i.e., those that provided information). In the preferred embodiment, the service provider 25 deducts a fee for its service from the fees collected from the interested party in step 260. In one particular embodiment, the fee may be based on the number of mailpieces for which information was obtained. As an alternative, instead of contacting the service provider 25 to request and be provided with information about one or more mailpieces, the interested party may contact a post 20 directly to request the information. In this embodiment, the post 20 that is contacted will search its records for mailpieces that satisfy the request criteria and will provide information, if found, directly to the interested party.

Thus, the steps shown in FIG. 5 enable an interested party to request information for one or more particular mailpieces that satisfy certain predefined request criteria after the mailpieces have been mailed, and the interested party only needs to pay for the information if it is available. For example, a mailer 10 may request information, such as tracking information, for all mailpieces sent to a particular destination address or zip code, and optionally may also further specify a particular mailing date or range of dates of interest. It should be noted that the requestor need not know the unique ID of the mailpieces when making the request, thereby allowing interested parties other than the mailer 10, e.g., the recipient, law enforcement officials, etc., to request information. For example, a recipient may request information, such as tracking information, for all mailpieces sent to the recipient (i.e., a destination address), or all mailpieces sent to the recipient from a particular mailer 10. Law enforcement officials may request information related to all mailpieces that were processed in a certain postal facility within a certain date range (e.g., when Anthrax was found). Once this information is obtained, and if it includes a unique identifier as described elsewhere herein, the interested party may then request additional value added services for one or more of the mailpieces, such as redirection of the mailpiece(s), according to the method described in connection with FIG. 4.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a mail system having one or more posts, a method of providing mailpiece related information to an interested party, comprising:

Receiving an information request from said interested party, said information request including at least one of an identification of a mailer and an identification of a recipient;

Determining, by a computer processor, whether information relating to each of one or more mailpieces that matches said at least one of said identification of said mailer and said identification of said recipient is stored by at least one of said one or more posts;

if it is determined that information relating to each of one or more mailpieces that matches said at least one of said identification of said mailer and said identification of said recipient is stored by at least one of said one or more posts: (i) receiving, by the computer processor, said mailpiece related information for each of said one or more mailpieces, (ii) charging said interested party for said mailpiece related information, and (iii) providing said mailpiece related information for each of said one or more mailpieces to said interested party; and if it is determined that information relating to each of one or more mailpieces that matches said at least one of said identification of said mailer and said identification of said recipient is not stored by at least one of said one or more posts, not charging said interested party for said information request.

2. The method according to claim 1, wherein the system includes a service provider in communication with said one or more posts, wherein said receiving step includes said service provider receiving said information request, and wherein said determining step includes said service provider contacting one or more of said one or more posts and requesting stored information relating to any received mailpiece that matches said at least one of said identification of said mailer and said identification of said recipient.

3. The method according to claim 1, wherein said information request further specifies a mailing date or range of dates.

4. The method according to claim 1, wherein said interested party is a mailer of said one or more mailpieces.

5. The method according to claim 1, wherein said interested party is an intended recipient of said one or more mailpieces.

6. The method according to claim 1, further comprising sending a payment to each of the at least one of said one or more posts that stores information relating to each of one or more mailpieces that matches said at least one of said identification of said mailer and said identification of said recipient.

7. The method according to claim 2, wherein said service provider is independent from said one or more posts.

8. The method according to claim 2, wherein said one or more posts comprise a plurality of posts, wherein said service provider is one of said one or more posts, and wherein said contacting step comprises contacting two or more of said plurality of posts.

9. The method according to claim 2, wherein said information request further includes tracking information.

10. The method according to claim 2, wherein said information request further includes a unique mailpiece identifier.

* * * * *